Figure 4:
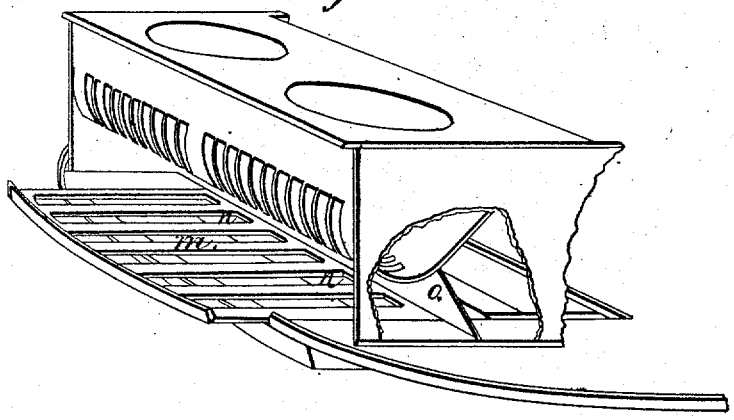
Figure 1:
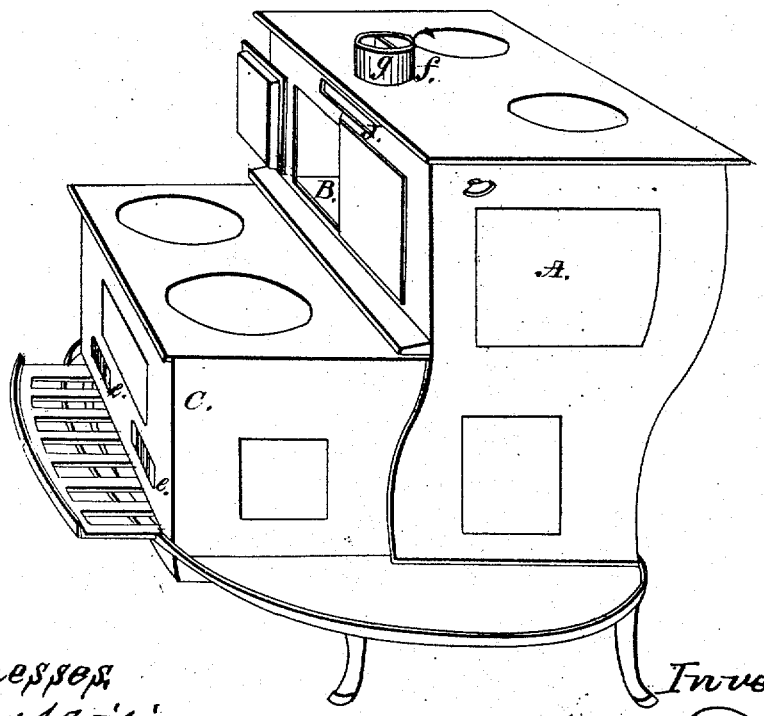
Figure 3:
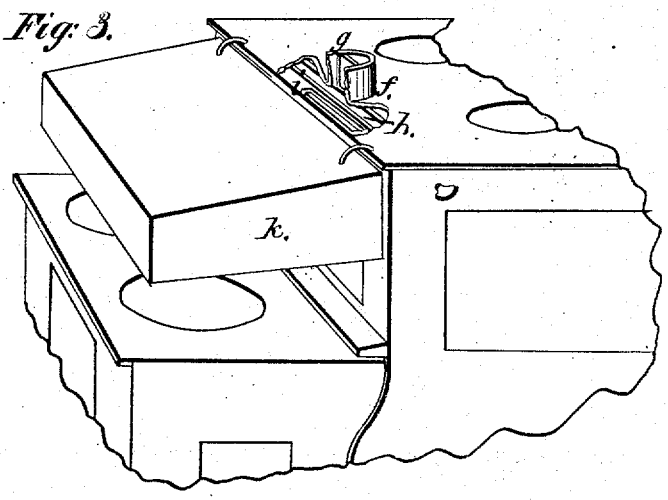
Figure 2:
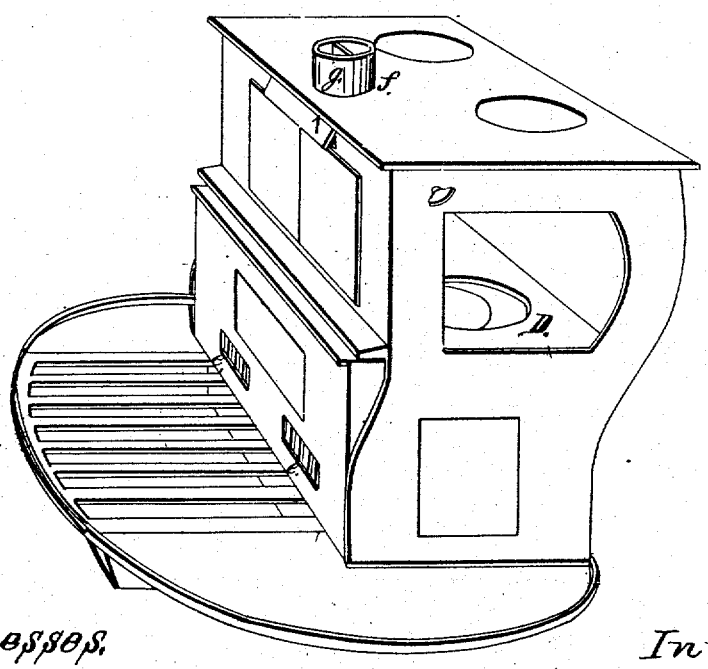

9350X

Sheet 1-2 Sheets.

D. Williams.

Cooking Stove.

Patented Feb. 3, 1836.

Witnesses.
Daniel Whiting
Richard L. McDonald

Inventor.
Daniel Williams

9350X

Sheet 2 - 2 Sheets.

D. Williams.

Cooking Stove.

Patented Feb. 3, 1836.

Witnesses.

Daniel Whiting
Richard L. McDonald.

Inventor.

Daniel Williams

9350 X

* Daniel Williams.
Letters Patent. (Patented Feb. 3. 1836)

The Schedule referred to in these Letters Patent, and making part of the same, containing a description in the words of the said Daniel Williams himself, of his improvement in the Cooking Stove.

---

To all to whom these presents shall come,

Be it known that I, Daniel Williams, of the Town of Schaghticoke, in the County of Rensselaer, and State of New York, have invented new and useful improvements in Stoves, and that the following is a full and exact description thereof.

Stoves upon the principles of the improvements herein to be described, are designed principally for Cooking, Baking and Heating Water for Washing, &c. In size it may be varied at discretion. Its dimensions however should be such as to accommodate its particular parts or members: As for instance; it should be of a length and breadth that will allow room for the boilers designed for it; and in height, as well as horizontal extent, space must be provided for a proportional fire place and oven, as well as passages for the circulation of heat round the oven, for draft of air to the fire, and for carrying off the smoke: So also, of the hearth being formed by an extension of the bottom plate of the stove in front, and at the ends, it must be proportioned to the fire place, and suited to the practical purposes required in relation thereto. These as matters of judgment, as will be indicated in the description, are here left without further description in these particulars.

The fire place from the hearth upwards, should occupy about one half of the stove in height; and horizontally extend from one end to the other, and from front to rear at the bottom. The oven including the passage for heat and smoke over the top, constitutes about the other half. The flue from the fire place passing up the back side of the oven, requires the back plate of the stove to be extended out beyond the oven, along its entire length and height, sufficient for the

* (Additional improvement added, 26. March 1844.)

purpose. This extension may be by carrying the plate up in a curve; or otherwise, beginning about half way of the fire place in respect to it height. The end plates of the Stove, which are to extend from the hea to the top, must be made to correspond with this curve or swell of t back plate. In order to extend the heat quite over the top of the oven the opening for it to pass off with the smoke into the Stove pipe, shou be near the centre, at the front edge of the top plate of the Stove; near back edge of the same plate, one or more openings for boilers may be provided.

The oven should have a single or double door in front, and also door at one end or both. The fire place is to be detached from the up right part of the Stove, and is to be made moveable backwards and forwards, so as to be drawn out from under the oven to the front of the hearth, that being sufficiently extended, to receive it. The fi place is to be furnished with openings in the top for boilers, one or mor according to the size of the stove, and also, with a single or double door in front; and at one end a door or opening is to be made correspondin with a door to be provided in the end plate of the stove, so that whe the fire place is shoved back to its station under the oven, the two openings shall constitute one end door to the fire place. [illegible] closing lid to the outside opening may be attached with hinges in the usual way, while that of the fire place, when drawn out, may be closed by a sliding plate or otherwise, so as to be taken off, or remov when shoved back within the stove.

By means of covers to the openings upon the fire place for boil in addition to their ordinary use, the action of the fire against the b tom of the oven, when placed under it, may be regulated according its intensity, or as the articles in the oven may require by leaving th lids off or on, as shall be expedient.

Directly over one, or each of these openings, a like opening m be made in the bottom plate of the oven, in order that articles ma be cooked as over the fire itself, by bringing the cooking utensil in im mediate contact with it. By this provision the steam and effluv common to such a process, are kept within the oven, or so, as not to affect the air of the room. In aid of which improvement a further opening shall be provided in the upper plate of the oven, and under, or nearly under the stove pipe, so that the steam, &c. generated in the cooking or in baking, may be carried off into the stove pipe. For this purpose also, a flange should be provided across the underside of the top plate of the stove, extending from side to side, so as to pass across the centre of the opening provided in it for the stove pipe, and extending up within the opening as a partition or plate, to the top of the collar with which the opening is to be supplied on the upper side of the top plate by which the opening will be divided into two equal parts. In connection with this partition, the first joint of the stove pipe may, in like manner, be divided vertically, so that when placed upon the collar thus provided for it, the dividing plate of the stove pipe shall be as a continuation of that which divides the opening through the collar. Then, by providing a damper for the opening in the top plate of the oven, and attaching it at the back edge to a rod or wire extended upon the oven, across the stove, a little forward of the flange but in the same direction, so that when the damper is turned up for the purpose of opening the passage which it covers, its upper edge will rest against the flange. This damper should also extend from one side to side of the stove, so as to close the passage between the top of the oven and the top plate of the stove; thus forming a partition from the oven to the top of the first joint of the stove pipe. This is to make good the draft for the steam, &c. from the oven, and to prevent its being driven back by the current from the fire place, and also, to prevent the smoke of the fire from coming into the oven. When the damper is down over the opening from the oven, the draft from the fire place will be through both divisions of the pipe. The rod, to which the damper is attached, should come through one side plate of the stove, so as to be turned by the end on the outside.

The steam and vapour also, arising from boiling or cooking upon the fire place, may be conducted into the same draft, which is thus provided for the oven by means of a plate of tin, or other material
attached to the front edge of the top plate of the stove, and extende
forward horizontally, or inclined downwards till it over reaches the
vessels or utensils upon the fire place. From the forward edge and en
of this plate, a flange or lip may be extended downwards to a greater
or less distance at discretion. The lower edge of the end flanges shou
be about horizontal from the front to the stove, or be made wider
at the stove than at the forward edge of the plate, so that by restin
their back edges against the front of the stove, they will answer the
purpose of braces to support the plate in its extended position.
This being the conductor of the steam, an opening is to be provided fo
it to pass through the front plate into the passage between the top of
the oven and the top plate of the stove, to which opening a door is to
be attached in front. The steam conductor should be so attach
to the top plate of the stove by hooks and pins, or otherwise, as to b
turned back so as to rest against the stove pipe, or be taken off
as occasion shall require.

A middle section of the hearth or bottom plate, extending fro
front to rear, and in width to within a small distance of each e
of the plate of the fire place is to be sunk down or cast with its surfa
below the other part of the hearth, similar to those of other stoves now
use. This sink is to be covered with a plate or sliding hearth, provis
being made upon the upper edge of its sides or jambs to place the
surface of the slide even with that of the permanent part of th
hearth. A grate is to be made in that part of it which is under the
fire when the fire place and plate are both in their station un
the oven. The section to be formed into a grate, may commence
immediately within the front plate of the fire place, and from i
extend back half the distance of its width, more or less. Anothe
grate should also be made in the same plate and of about the s
dimensions, forward or outside of the front of the stove. These are
the purpose of admitting air to the fire, the same passing down
through the outside grate, and up through the other to the fire to give the draft of air this direction and prevent it from passing under the inner grate, and into the flue back of the fire place, the sliding hearth should be provided with a flange back of the grate extending down near to the bottom, and across the width of the sink; yet, so as to move backwards and forwards with the slide. The inside grate may be made to consist of one range or two, being in the latter case divided in the centre from front to rear, so as to have one of the divisions under each place for the boiler on the top of the fire place, when two are provided. A sliding damper may be placed over each of these divisions of the grate to be regulated by a wire handle coming through the front plate, or otherwise; by which the draft of air can be admitted to the fire under one boiler, and excluded from the other, if required. The bottom of the fire place itself, may also consist of grates, either horizontal from rear to front, or commencing at any discretionary line upon the bottom, and extended up in front, towards the front plate, or independent of the plate by a curve or angle to such distance as shall be deemed expedient. This grate also, may be divided like the for the draft, or otherwise, or not at all, at discretion. An opening may be provided in the front plate corresponding, in horizontal extent, to each division of the grate, or otherwise, and extending up and down such distance as shall be considered sufficient, either for occasional draft of air for the fire, or for other purposes, may also, be in the form of grate and provided with doors to close them, or with isinglass to admit the light of the fire through when closed.

The end plates of the fire place should have the back edge of each fitted to the curve or swell of the back plate of the stove, so as to sit snugly to it, when in its place under the oven. The forward edges also of the end plates of the stove, from as high up as the fire place extends, should be made to correspond with the back edges so as to be parallel or nearly so, with them; the end plates and front of the fire place may, in like manner, correspond with the forward edges of the end plates of the stove, or they may be made straight, a single or double

9350 X 2-3-1836 door in front of the fire place, above the opening or grate therein, as above described, and also, above the inside grate of the fire place, may be provided for the introduction of fuel or other purposes. The back plate of the fire place, from a line that will allow what shall be considered a suitable width for it at the bottom, should be extended up nearly in the direction of the back edge of the top plate of the fire place to a distance + + + shall leave between the two plates a space sufficient for the passage of the smoke, &c. from the fire; or the two plates may be nearly closed in the centre, and the upper edge of the back plate scolloped out, or otherwise made low enough for such smoke passage, in rear of each boiler, for the purpose of giving a direction for the fire and heat under or round the boiler. A flange is also to be extended from the under side of the fire place, back of the grate down to the sliding hearth, so as to prevent the air intended for the fire from passing under, and so up the backside.

Fire places for these stoves, which are designed exclusively or principally for burning coal, may be constructed without an opening in the end plate, and the bottom of the grate of the fire place, may be more elevated, or a greater space left between it and the sliding hearth, so that a pan of tin or sheet iron, or other article perforated as a sifter, may be placed under it to receive the droppings from the fire. And the form of the grate, as well as its capacity for holding fuel, may be adapted to all purposes at discretion, either with a view of burning coal or wood or both, and with the front door open or closed, or without doors, as shall be deemed expedient, or stoves constructed upon the principles of these improvements, may be supplied with a fire place for coal, and another for wood, both fitted alike, to the same apartment of the stove, which shall be the choice of the purchaser. The top of the fire place for coal may be made to be raised up upon the back edge, or upon a projection near each corner of the back edge, as a hook or bracket to rest upon; corresponding projections being provided for it from the flat plates of the fire place, so as to have the forward edge of the top plate to be movable up and down upon a pin or hinge joint, and at the same time be kept in its place.

9350 X 2-3-1836

Provision should be made by a handle or otherwise, for drawing
ut the fire place upon the hearth, and returning it to its place as occa
sion shall require. Of the improvements above specified and described
claim, as my own invention, the moveable or sliding fire place, with
ts provisions and appendages as connected with the other permanent
arts of the stove; and especially, the improvement of furnishing thereby
in the oven, what is equivalent to a double bottom, and with it, the ad-
antages thereby obtained of regulating the heat, or allowing it to act
ith greater or less intensity upon the oven. And also, the manner of pre-
senting cooking utensils to the immediate action of the fire within the
ven, together with the provisions of carrying off the steam, &c. to be
enerated in the oven, or upon the fire place; All these I claim, and the
rinciples thereby embraced as especially connected and combined with
ach other, and with the other parts and members of the stove as a whole.

Subscribed this 5th day of December, 1835.

Witnesses
Wm. Wright Jr.
Daniel Whiting

Daniel Williams

Exd. W.G.

(Drawing Completed)

249 (hinds)

(Recd & Recorded June 4. 1839.)